INVENTOR.
NORMAN L. STAUFFER
BY
ATTORNEY

United States Patent Office 3,249,001
Patented May 3, 1966

3,249,001
AUTOMATIC FOCUSING PHOTOGRAPHIC
PROJECTOR
Norman L. Stauffer, Denver, Colo., assignor to
Honeywell Inc., a corporation of Delaware
Filed June 10, 1963, Ser. No. 286,708
13 Claims. (Cl. 88—24)

My invention is concerned with an improved photographic projector and particularly with a photographic projector having means to maintain the proper focus of a photographic image which is projected on a screen or the like.

Photographic projectors utilize a source of energy in the form of a projection bulb which, through the medium of condensing lens systems and the like, illuminates a photographic transparency, the image of the transparency being focused by a movable objective lens to project this image, in focus, on a screen to be viewed. A majority of the projectors of this general type provide an in-line configuration of the movable objective lens and light source, these elements constituting the generally horizontal optical axis of the projector. Mounted intermediate the lens and light source is a slide guide means which is adapted to hold a photographic transparency in a generally vertical plane, the plane of the transparency being generally perpendicular to the optical axis of the projector. The objective lens of the projector is movable axially along the optical axis to vary the spacing between the plane of the transparency, held in the slide guide means, and the objective lens. In this manner, the image of the transparency is projected on a screen and is focused by observing the image and moving the objective lens along the optical axis until the image is clear and distinct. Generally, the energy source incorporated within the projector is in the form of an incandescent bulb which emits radiant energy covering a wide spectrum, including the ultraviolet region, the visible region, and the infrared region. In order to "cool" this light, a filter, or optical means having selective light transmission properties, is normally positioned along the optical axis at a position intermediate the bulb and the slide guide means. Thus, the slide area defined by the slide guide means is illuminated by only a selected portion of this radiant energy, this selected portion being the most desirable visible portion of the spectrum.

The photographic transparency to be projected may be itself mounted in a variety of mounts or slide holders. The most common mount is the cardboard "ready-mount" construction. In this mount, the film portion bearing the image to be projected is held at its edges by an encircling cardboard frame. Other forms of mounts provide plastic frames and windows to imprison and hold the transparency to be projected. Still other mounts may be arranged to imprison the transparency between two pieces of glass which may be held together at their edges by a variety of clamping means. All of these mounts are of generally varying thickness.

The slide guide means of a photographic projector must be constructed and arranged to accept a photographic transparency which is mounted in any of the mounts which might be utilized by the photographer. Furthermore, it is not uncommon that automatic or semiautomatic projectors are utilized to move the slides in and out of the projector from a slide storage tray, and that various types of slide moutns are intermixed within the storage tray. As a result, slight variations in axial position of the slide along the optical axis of the projector may result from one slide to another and from one slide mount to another.

Furthermore, a common condition to be experienced in the use of a photographic projector is to encounter creeping, buckling, or popping of the transparency itself due to temperature changes which the slide experiences while being illuminated by the projector bulb. Any distortion or movement of the slide, along the optical axis of the projector, requires a repositioning of the objective lens of the projector in a like direction along the optical axis to maintain focus and thus maintain a clear image on the screen.

With the above general discussion in mind, my invention relates to an optical means to sense the slide position along the optical axis and to maintain a given distance between the slide and the objective lens of the projector. By this means, proper focus is maintained. Specifically, I provide an arrangement in which a first means forms an image of a source of radiation at the plane of the slide, as defined by the slide guide means. A second means is provided to then re-image the reflected energy, which is reflected from the slide, and to focus this reflected energy on differential energy sensing means, this last-named means being responsive to the position of this re-image reflected energy.

In the preferred embodiment, I show a pair of closely spaced photoelectric cells which, when the projector is in proper focus, are equally illuminated by the re-image of the reflected energy. As the slide buckles and thus moves along the optical axis, this re-image of the reflected energy also moves to illuminate more intensely one of the photoelectric cells. An output motive means in the form of a reversible A.C. motor is provided to move the objective lens and to also reposition the re-image of the reflected energy at the null or balance point on the photoelectric cells.

Also, in the preferred embodiment of my invention, I have chosen to provide separate lenses for each of my above defined first and second means. One of these lens focuses the image of the source at the slide plane, and the other of these lens focuses the re-image on the photoelectric cells. Movement of the re-image on the photoelectric cells is achieved by coupling one of the two lenses to move directly with the movement of the objective lens and to locate this lens which is so coupled approximately midway between the image at the slide plane and the source or the photoelectric cell.

My invention will be apparent to those skilled in the art upon reference to the following specification, claims, and drawings, of which:

Figure 1:
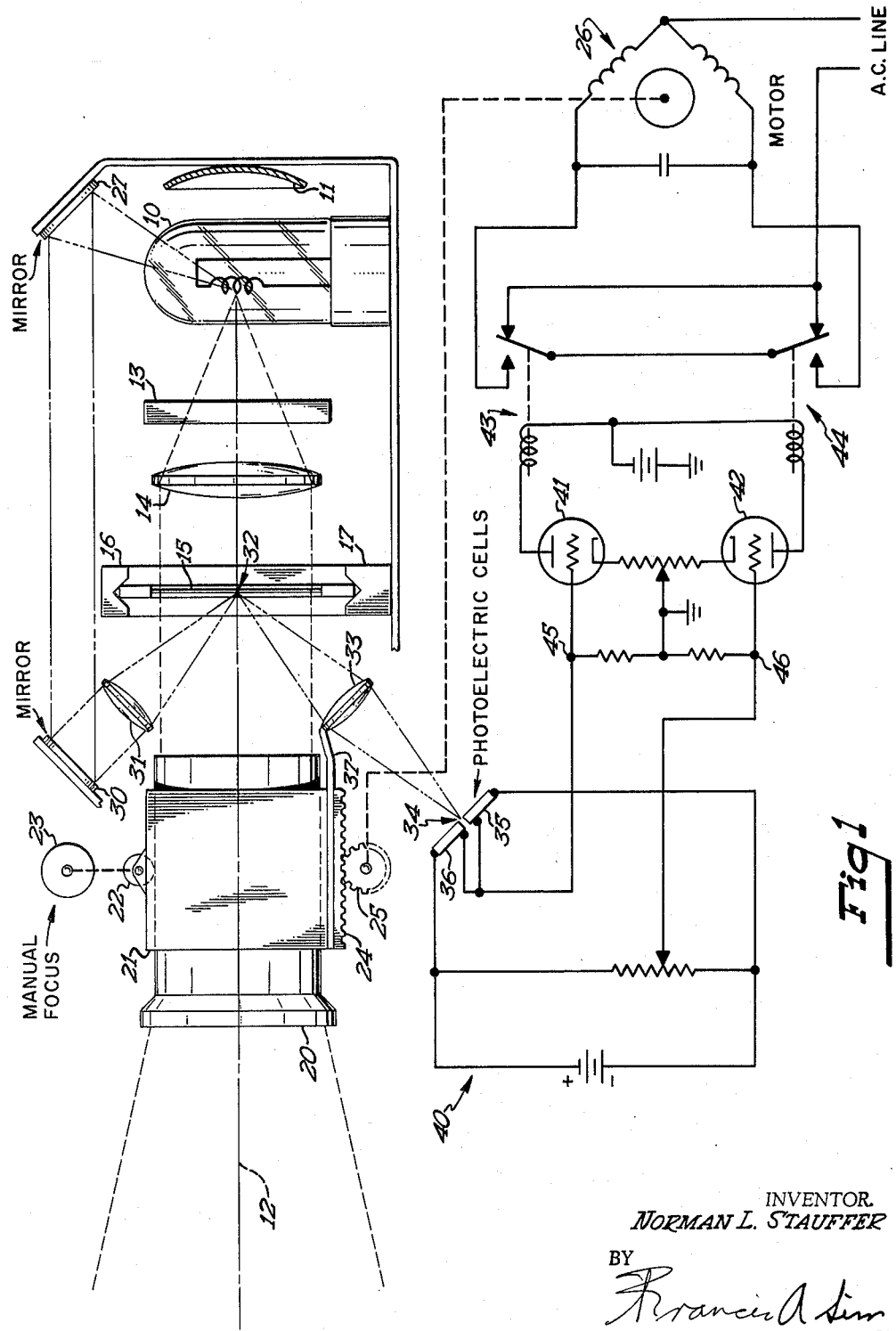
FIGURE 1 is a showing of an embodiment of my invention.

Referring to FIGURE 1, reference numeral 10 designates a projection bulb which is associated with a reflector 11 to direct light generally down an optical axis identified by broken line 12. Bulb 10 is shown to include an incandescent filament which, for purposes of simplicity, is considered to be a point light source.

Figure 5:
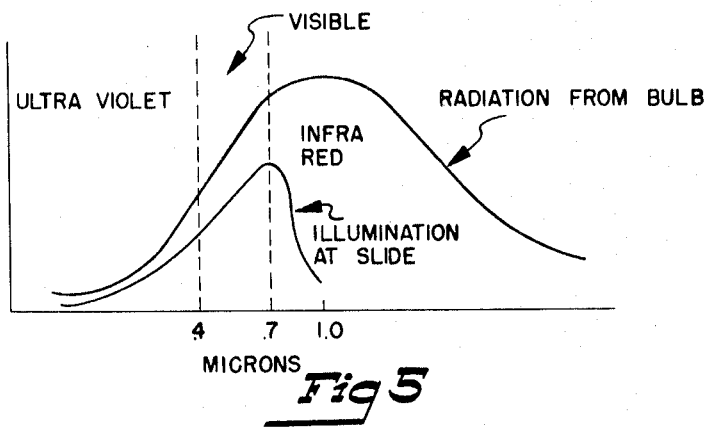
FIGURE 5 is a graphic representation of the radiation from the projection bulb and the illumination at the slide.
Figure 6:
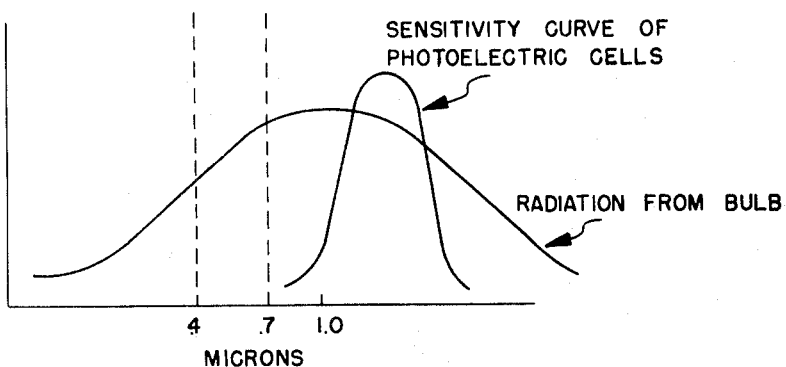
FIGURE 6 is a graphic representation of the sensitivity curve of the photoelectric cells, as relafed to the radiation from the bulb.

The light or radiant energy generated by bulb 10 passes through an optical filter or heat glass 13. This member 13 possesses selective radiant energy transmission properties and in a sense "cools" the light generated by bulb 10. Referring for the moment to FIGURE 5, this figure shows a representation of the radiation from bulb 10 and, as can be seen, the major portion of this radiation lies in the infrared region, in the vicinity of one micron. The visible region is normally considered to exist from .4 to .7 micron, with the ultraviolet region lying below .4 micron. The illumination at the slide, as controlled by heat glass 13, is identified by a curve which shows that the major portion of the illumination at the slide consists of visible radiation. A certain amount of ultraviolet radiation passes onto the slide and a small portion of the infrared radiation passes onto the slide to heat the slide.

Referring again to FIGURE 1, reference numeral 14 identifies generally a condensing lens which controls the illumination of bulb 10 to illuminate a slide 15 positioned in a pair of stationary slide guides 16 and 17.

The illuminated slide is then focused on a screen or the like by means of a movable objective lens 20 which is movably held in a holder 21, holder 21 carrying a friction wheel 22 connected to a manual focus knob 23. Knob 23 is effective to move objective lens 20 within its holder 21. I have chosen to diagrammatically show a manual focus knob 23 where in fact this may be a remote control, for example, a switch which is effective to cause rotation of friction wheel 22 by way of energization of a reversible electric motor.

The holder 21 includes a gear rack 24 which is coupled to a gear 25 to cause movement of holder 21 and objective lens 20, as a unit, along optical axis 12, under the control of a reversible A.C. motor 26, this motor being controlled in a manner to be described.

It is my intention that objective lens 20, slide guides 16 and 17, condensing lens 14, heat glass 13, bulb 10, and reflector 11, be representative showings of conventional components to be found in photographic projectors. For purposes of simplicity, I have chosen to show these components somewhat diagrammatically. It is further intended that this projector may be manual, semi-automatic or automatically operated.

As will be readily appreciated, the stationary slide guides 16 and 17 define a generally vertical plane, which is generally perpendicular to optical axis 12, at which slide 15 is adapted to be positioned. An essential feature of my invention utilizes the concept of focusing a pattern of radiant energy at the plane defined by slide guides 16 and 17, and to then re-image this pattern at radiation sensitive means which is sensitive to the position of this re-image pattern. Motive means is then energized by the radiation sensitive means to reposition the objective lens 20 along the optical axis 12, and to also reposition a further means to provide repositioning of the re-imaged pattern on the radiation sensitive means.

In FIGURE 1, I provide a pair of mirrors 27 and 30 which are constructed and arranged to pick up radiant energy from bulb 10 which is not filtered by heat glass 13 and is thus rich in the infrared portion of the spectrum. This source of radiant energy, having a characteristic which is different from the characteristic of the energy which illuminates slide 15, is controlled by a first lens 31 which focuses an image of the source (in this case bulb 10) at a spot 32 on the plane defined by the slide guides 16 and 17 and occupied by slide 15 in its "flat" condition, that is the condition of the slide when it has not crept, buckled or popped. Furthermore, lens 31 and its associated components are arranged to project this image, in focus, at spot 32, and at an angle to the optical axis 12 of the projector. Thus, the radiant energy of the second characteristic (rich in infrared) is reflected from the surface of the slide and is refocused (re-imaged) by a second lens 33 at a point 34 adjacent radiation sensitive means in the form of a pair of closely spaced photoelectric cells 35 and 36.

It should be mentioned at this point that photoelectric cells 35 and 36 may be constructed to be sensitive primarily to an infrared or second characteristic radiant energy. Also, filter means may be associated with photoelectric cells 35 and 36 to impart this property to the photoelectric cells.

In the apparatus as shown in FIGURE 1, the second lens 33 is connected by means of a member 37 to the objective lens holder 21 to move in the same direction and through the same distance as the lens holder 21 is caused to move by rotation of gear 25. Furthermore, as will be apparent upon reference to FIGURE 3, lens 33 is mounted approximately halfway between point 32 and point 34.

Photoelectric cells 35 and 36 are connected to motive means in the form of a D.C. bridge circuit 40, a pair of electron discharge devices 41 and 42, and relays 43 and 44, the switches of the relays being connected in controlling relation to windings of the reversible A.C. motor 26. Specifically, photoelectric cells 35 and 36 are photoresistive devices whose impedance varies with the amount of illumination impinging upon the cell. When spot 34 exists at a point between the cells, the cells are equally illuminated and have approximately equal resistance so that the electrical voltage provided at the input electrodes of discharge devices 41 and 42, these input points being terminals 45 and 46, is approximately zero. As point 34 shifts onto one of the cells, and away from the other cell, one of the discharge devices 41 and 42 conducts to the point where its relay is energized and motor 26 is driven in a proper direction to re-establish focus of the objective lens on the slide and to reposition spot 34 at the point between the photoelectric cells which approximately equally illuminates the photoelectric cells.

Figure 3:
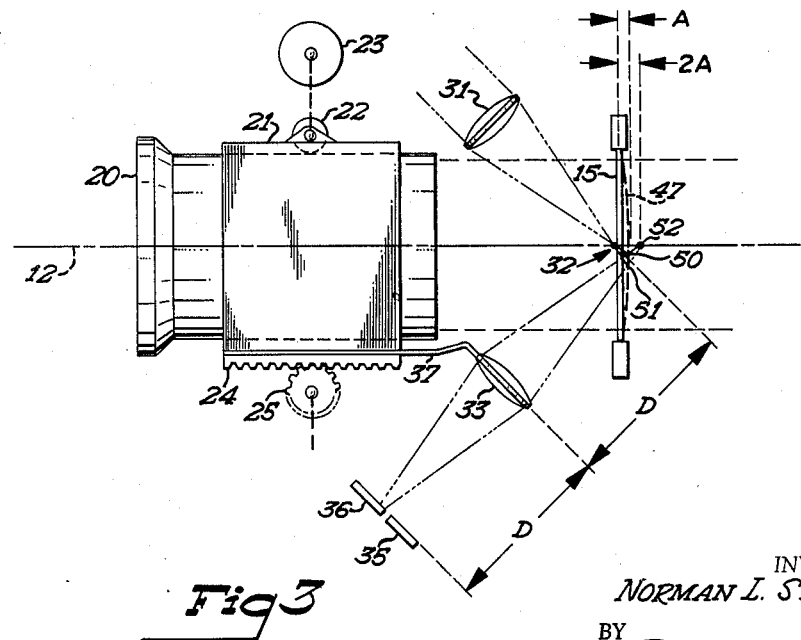
FIGURE 3 is a showing of a portion of the apparatus of FIGURE 1, showing a slide in the buckled position and showing the relationship of certain critical distances.
Figure 4:
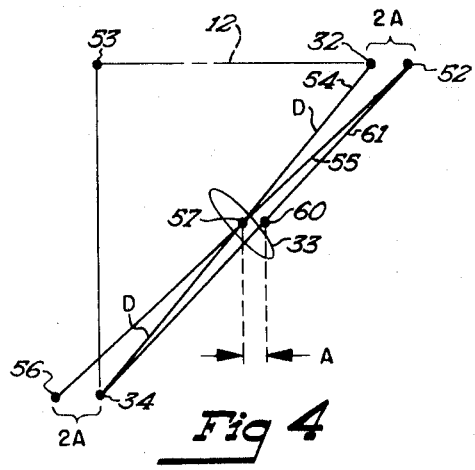
FIGURE 4 is a geometric drawing of the structure of FIGURE 3.

My invention can best be understood by considering a condition of operation, with reference to FIGURES 1, 3 and 4. Initially the slide 15 which is positioned at the optical axis 12 is relatively cool and exists in a "flat" condition, as shown in FIGURE 1. The operator of the projector then controls the manual focus knob 23, moving objective lens 20 along the optical axis 12 and within the stationary holder 21, to produce a sharp and clear focus of the image of the slide on a screen. The temperature of the slide then increases at it remains within the slide guides 16 and 17. The heating of the slide causes it to expand, to creep, or to pop, to a bucked position, as represented by broken line 47 of FIGURE 3. Lens 31 continues to focus a pattern or spot at point 32. However, the light provided by this optical system continues along its inclined axis, striking the new position of the slide at the point represented by reference numerals 50 and 51. Insofar as the optical system including lens 33 is concerned, the apparent image of spot 32 has now shifted to point 52. Actually, the center portion of slide 15 has shifted a distance represented at A in FIGURE 3. The apparent image of spot 32 has however shifted a distance twice this, identified as 2A in FIGURE 3. As a result of this shifting, the optical system including lens 33 causes the re-image of the pattern or spot to illuminate photocell 36 more than photocell 35 is illuminated. As a result, terminal 45 becomes more positive, discharge device 41 conducts to energize relay 43, and motor 26 runs in a direction to cause the objective lens holder 21 to move to the right as shown in FIGURE 3, carrying with it the objective lens 20 and lens 33. In order to maintain focus on the now buckled slide, it is necessary that the objective lens 20, carried by holder 21, move back a distance A. For this reason, I mount lens 33 approximately halfway between the photoelectric cells and the point 32, this entire distance being distance 2D, lens 33 being mounted a distance D from each of these locations.

Referring to FIGURE 4, reference numeral 53 designates a fixed point on objective lens 20. Points 32 and 52 are identified along the optical axis 12. Point 34 completes a generally right triangle 53–32–34 which establishes the initial condition which I have above described as existing prior to heating of slide 15. In this condition, the optical axis of the optical system which includes lens 33 exists at the line 54.

When the slide pops the distance 1A, and before lens 33 moves, the optical axis of the system including lens 33 can be represented by the line 55, thus showing that the point 34 has in effect moved a distance 2A to a new point designated by reference numeral 56. This new position 56 is the position disclosed in FIGURE 3 wherein photocell 36 is illuminated to a greater extent than is photocell 35.

As I have mentioned, this unequal illumination of the photocells causes holder 21 and objective lens 20 to move to the right, as shown in FIGURES 1 and 3, and to move a distance A. Movement of these elements a distance A also causes lens 33 to move a distance A.

In FIGURE 4, reference numeral 57 identifies the center of lens 33 in the initial position, while reference numeral 60 identifies the center of lens 33 after it has moved a distance A. Movement of lens 33 a distance A, by virtue of a similar triangle arrangement, with equal distances from the center of lens 33 to point 32 and to point 34 causes a new optical axis, to exist as represented by line 61, thus again re-imaging the apparent position of the pattern or spot at point 52 at the point 34 to equally illuminate the photoelectric cells 35 and 36 and thus "satisfy" the motive means including motor 26.

The described operation has resulted in an actual movement of the re-image a distance 2A (from 56 to 34) to correspond to the apparent 2A movement of the image from point 32 to point 52. This has been accomplished by actual movement of the slide a distance A, by actual movement of the objective lens a distance A, and by actual movement of lens 33 a distance A. Thus, objective lens 20 remains in focus on slide 15 even though this slide has buckled. While I have chosen to describe the arrangement whereby the slide buckles toward the bulb 10, along the optical axis 12, a similar description suffices in the case where slide 15 buckles in the opposite direction.

Figure 2:
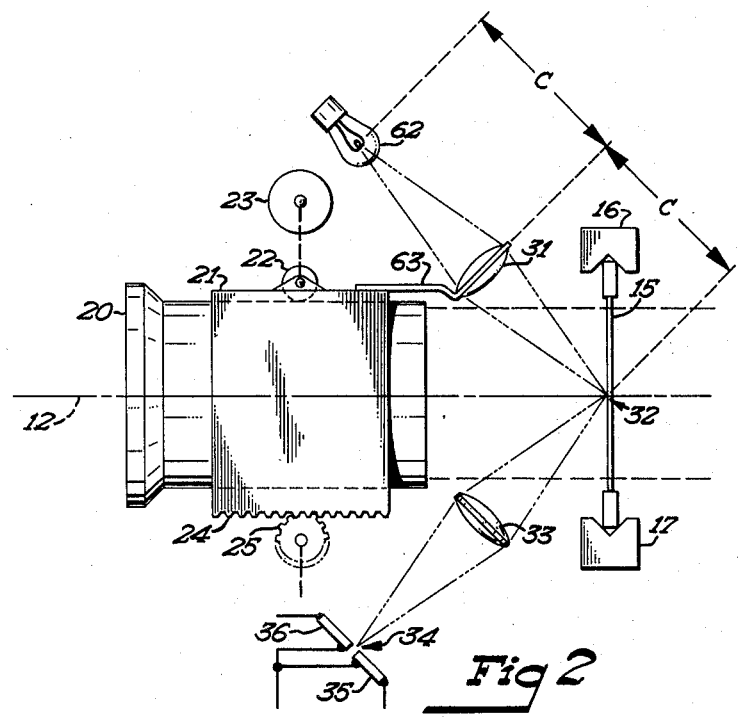
FIGURE 2 is a showing of a modified form of a portion of the showing of FIGURE 1.

Thus far I have described an arrangement whereby control of the re-imaging is achieved by movement of the lens element 33 associated with the photoelectric cells 35 and 36. In FIGURE 2, I show a modification wherein lens 31 is associated with a source of radiation of the second characteristic identified by reference numeral 62. In this case, lens 31 is coupled to the lens holder 21 by means of a member 63 to focus an image of source 62 at point 32. In the modification of FIGURE 2, the repositioning of the re-image at point 34 is achieved by movement of lens 31 as objective lens 20 and holder 21 move. In this case, lens 31 is mounted approximately midway between source 62 and the focused image of this source at the plane of slide 15, this being point 32. This spacing condition is indicated by the distance labeled C.

From the above description it can be seen that I have provided an improved photographic projector in which focus is automatically maintained by the use of a second light source of different characteristic (to prevent interference with the main light source) and in which a portion of my focus sensing means is repositioned with movement of the projector objective lens to maintain a fixed objective lens-to-slide distance.

Additional modifications of the foregoing apparatus are disclosed and claimed in my copending applications Serial Nos. 355,040 and 359,592.

Other modifications of my invention will be apparent to those skilled in the art; therefore, it is intended that the scope of my invention be limited solely by the scope of the appended claims.

I claim as my invention:

1. A photographic projector comprising; illumination means to provide energy of a first characteristic, a movable objective lens mounted in operative cooperation with said illumination means to define an optical axis of the projector, slide support means mounted intermediate said illumination means and said lens and adapted to support a photographic transparency at said optical axis to illuminate the transparency only with said energy of said first characteristic; slide position sensing means having means including first lens means focusing a pattern of energy of a second characteristic on the transparency, and having means including second lens means focusing a re-image pattern of wave energy which is reflected from the transparency on wave energy sensing means sensitive primarily to energy of said second characteristic; and motive means having an input controlled by said sensing means and having an output connected to control the position of said objective lens and one of said first and second lens means to maintain a fixed distance between said objective lens and the transparency.

2. A photographic projector comprising; a light source, a movable objective lens mounted in operative cooperation with said light source to define an optical axis of the projector, slide support means mounted intermediate said light source and said lens and adapted to support a photographic transparency at said optical axis, shield means having a selective light transmission property mounted intermediate said light source and said slide support means to illuminate the transparency only with a selective wave energy produced by said light source, slide position sensing means having means including first lens means focusing a pattern of wave energy on the transparency which includes wave energy different from said selective wave energy, and having means including second lens means focusing said pattern of different wave energy which is reflected from the transparency on wave energy sensing means sensitive primarily to said different wave energy; and motive means having an input controlled by said sensing means and having an output connected to control the position of said objective lens and one of said first and second lens means to maintain a fixed distance between said objective lens and the transparency.

3. A photographic projector, comprising; a movable objective lens, a source of illumination associated with said objective lens to define an optical axis, said source of illumination being constructed and arranged to provide light energy of a first characteristic, slide support means adapted to support a photographic transparency between said objective lens and said source of illumination so that light energy of said first characteristic illuminates the transparency to then pass through said objective lens to illuminate a screen or the like, a further source of illumination constructed and arranged to provide light energy of a second characteristic, first focusing means associated with said further source of illumination to focus a pattern of light energy of said second characteristic at the plane of said slide support means and at an angle to said optical axis, light sensitive detecting means sensitive primarily to energy of said second characteristic, second focusing means associated with said detecting means to focus a pattern which is reflected at an angle to said optical axis from the transparency which is supported at said slide support means upon said detecting means, means movably mounting one of said first and second focusing means at a distance approximately one half the distance between said slide support means and said further source of illumination and said detecting means respectively, and means controlled by the output of said detecting means effective to move said objective lens and said one of said first and second focusing means to maintain a fixed spacing between said objective lens and said slide support means and to also maintain said pattern focused upon said detecting means at a fixed position.

4. In combination with a photographic slide projector having a movable objective lens which is movable to focus a projected image of a slide on a screen or the like, the improvement comprising means to maintain a constant lens-to-slide distance, including; first means to form an image of a radiation source at the normal plane of the slide, second means to re-image the reflected image of the radiation source on differential radiation sensing means responsive to the position of said re-image thereupon, and third means controlled by said sensing means to move the objective lens and to move at least a portion of one of said first and second means to reposition the objective lens and to reposition said re-image as the slide moves from said normal plane due to buckling of the slide.

5. A photographic projector, comprising; an objective lens, a slide holder adapted to hold a slide in a given plane, means to illuminate a slide positioned at said slide holder to thereby project an image thereof through said objective lens onto a screen or the like, first means constructed and arranged to focus an image of a light source on the said given plane of said slide holder and at an angle thereto, said image being reflected by a slide positioned thereat, differential light sensitive means, second means constructed and arranged to focus said reflected image upon said light sensitive means, motive means controlled by said light sensitive means and responsive to the position of said reflected image upon said light sensitive means, and means connecting said motive means to said objective lens and to said second means to reposition said objective lens to maintain its focus upon the slide and to reposition said second means to maintain the position of said reflected image upon said light sensitive means both of which conditions momentarily change as the slide buckles and moves from the said given plane due to heating or the like of the slide.

6. A photographic projector, comprising; an objective lens, a slide holder adapted to hold a slide in a given plane, means to illuminate a slide positioned at said slide holder to thereby project an image thereof through said objective lens onto a screen or the like, first means constructed and arranged to focus an image of a light source on the said given plane of said slide holder and at an angle thereto, said image being reflected by a slide positioned thereat, differential light sensitive means, second means constructed and arranged to focus said reflected image upon said light sensitive means, motive means controlled by said light sensitive means and responsive to the position of said reflected image upon said light sensitive means, and means connecting said motive means to said objective lens and to said first means to reposition said objective lens to maintain its focus upon the slide and to reposition said first means to maintain the position of said reflected image upon said light sensitive means, both of which conditions momentarily change as the slide buckles and moves from the said given plane due to heating or the like of the slide.

7. A photographic projector, comprising; an objective lens, a movable holder for said objective lens, slide guide means mounted in alignment with said objective lens and adapted to normally hold a photographic transparency at a first plane, means providing predominantly visible radiation for illuminating the transparency for projection, means coupled to said objective lens and adapted to move said objective lens within said holder to focus a projected image of the transparency on a screen or the like, first means including a source of predominantly infrared energy and including means to focus an image of said source on the said first plane, said image then being reflected by a transparency positioned in said slide guide means, second means including position responsive energy sensing means responsive primarily to infrared energy and including means to focus the said reflected image of said source on said sensing means, the position of said reflected image on said sensing means being caused to move in the event the transparency buckles or the like and thus is no longer positioned at the said first plane, and motive means controlled by said sensing means and connected to move said holder and said objective lens as a unit to maintain focus of the projected image of the transparency.

8. A photographic projector, comprising; an objective lens, a movable holder for said objective lens, a first source of energy adapted to radiate energy of a first characteristic, slide guide means mounted intermediate said objective lens and said first source and adapted to normally hold a photographic transparency at a first plane, means coupled to said objective lens and adapted to move said objective lens within said holder to focus a projected image of the transparency on a screen or the like, first means including a second source of energy adapted to radiate energy of a second characteristic different from said first characteristic and including a first lens to focus an image of said second source on the said first plane, said image then being reflected by a transparency positioned in said slide guide means, second means including energy sensing means and including a second lens to focus the said reflected image on said sensing means, said sensing means being constructed and arranged to be responsive to the position of said reflected image on said sensing means, the position of said reflected image on said sensing means moving in the event the transparency buckles and thus is no longer positioned at the said first plane, and motive means controlled by said sensing means and connected to move said holder to maintain focus of the projected image of the transparency, and connected to move at least one of said first and second lenses to reposition the said reflected image on said sensing means.

9. A photographic projector, comprising; an objective lens which is movable along the optical axis of the projector, a projection lamp adapted when energized to radiate energy covering a relatively wide spectral range, slide guide means mounted intermediate said objective lens and said lamp and adapted to hold a photographic transparency at a plane defined by said slide guide means, filter means mounted intermediate said slide guide means and said lamp and adapted to allow a relatively narrow portion of said wide spectral range of energy to illuminate a transparency at said slide guide means, mirror means constructed and arranged to gather unfiltered radiation from said lamp, a first lens mounted to focus said unfiltered radiation at a point on said plane and at an angle thereto, said unfiltered radiation then being reflected by a transparency held by said slide guide means, differential energy sensing means, a second lens movably mounted approximately midway between said point on said plane and said sensing means, movable parallel to said optical axis, and mounted to focus said reflected unfiltered radiation at a point on said sensing means, motive means connected to be controlled by said sensing means in accordance with the position of said point thereon, and means connecting said motive means to jointly move said objective lens and said second lens in the same direction and through approximately the same distance as the transparency moves from said plane, to thereby maintain focus of said objective lens and to maintain the position of said point on said sensing means.

10. A photographic projector, comprising; an objective lens which is movable along the optical axis of the projector, a projection lamp adapted when energized to radiate energy covering a relatively wide spectral range, slide guide means mounted intermediate said objective lens and said lamp and adapted to hold a photographic transparency at the plane defined by said slide guide means, filter means mounted intermediate said slide guide means and said lamp and adapted to allow a relatively narrow portion of said wide spectral range of energy to illuminate a transparency at said slide guide means, means constructed and arranged to focus unfiltered radiation at a point on said plane and at an angle thereto, said unfiltered radiation then being reflected by a transparency held by said slide guide means, differential radiant energy sensing means, a second lens movably mounted approximately midway between said point on said plane and said sensing means, movable parallel to said optical axis, and mounted to focus said reflected unfiltered radiation at a point on said sensing means, motive means connected to be controlled by said sensing means in accordance with the position of said point thereon, and means connecting said motive means to jointly move said objective lens and said second lens in the same direction and through approximately the same distance as the transparency moves from said plane, to thereby maintain focus of said objective lens and to maintain the position of said point on said sensing means.

11. In combination with a photographic slide projector having a movable objective lens which is movable to focus a projected image of a slide on a screen or the like, the improvement comprising means to maintain a constant lens-to-slide distance, including; first means to form an image of a radiation source at the normal plane of the slide, second means to re-image the reflected image of the radiation source on differential radiation sensing means responsive to the position of said re-image thereupon, and third means controlled by said sensing means to move the objective lens and to move at least a portion of one of said first and second means to reposition the objective lens and to restore the relative position of said re-image and said sensing means as the slide moves from said normal plane due to buckling of the slide.

12. In combination with a photographic slide projector having an objective lens which is adapted to focus a projected image of a slide spaced from said lens on a screen or the like, said lens and said slide being spaced along an optical axis, the improvement, including, means to maintain a constant lens-to-slide distance, including; first means to form an image of a radiation source at the normal plane of the slide, second means to re-image the reflected image of the radiation source on radiation-sensing means responsive to the position of said re-image thereupon, and third means controlled by said sensing means to adjust the spacing between said objective lens and said slide without variation in the angular relationships thereof with respect to said optical axis, and to adjust at least a portion of one of said first and second means to maintain a balanced positional relationship of said re-image and said sensing means.

13. In combination with a photographic transparency projector having an objective lens which is adapted to focus a projected image of a photographic transparency spaced from said lens on a screen or the like, said lens and said photographic transparency being spaced along an optical axis, the improvement, including, means to maintain a constant lens-to-photographic transparency distance, including; first means to form an image of a radiation source at the normal plane of said photographic transparency, second means to re-image the reflected image of the radiation source at a point upon radiation-sensing means responsive to the position of said re-image thereupon, and third means controlled by said sensing means to adjust the spacing between said objective lens and said photographic transparency without variation in the angular relationships thereof with respect to said optical axis, and to maintain a balanced positional relationship of said re-image and said sensing means.

References Cited by the Examiner

UNITED STATES PATENTS

| 2,947,215 | 8/1960 | Mitchell | 88—26 X |
| 3,037,423 | 6/1962 | Shurcliff | 88—26 |
| 3,205,766 | 10/1965 | Ewald et al. | 88—24 |

FOREIGN PATENTS

| 903,962 | 10/1945 | France. |
| 823,404 | 11/1959 | Great Britain. |

OTHER REFERENCES

VEB, German application No. 1,127,617, published April 12, 1962.

NORTON ANSHER, *Primary Examiner.*

HAROLD H. FLANDERS, *Assistant Examiner.*